April 20, 1965 N. MOREAU 3,179,158
HEATER UNIT
Filed May 13, 1960
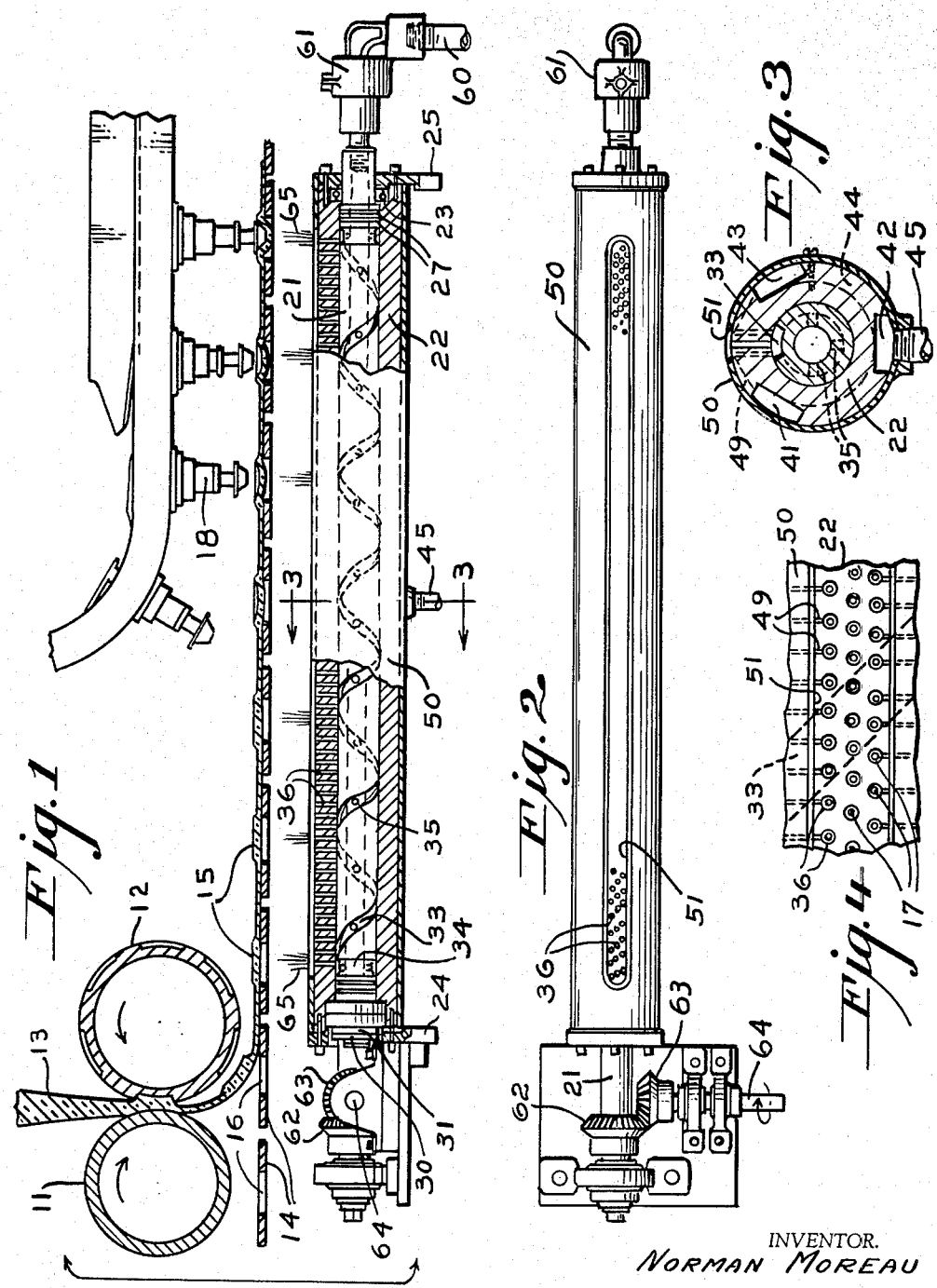
INVENTOR.
NORMAN MOREAU
BY
Clarence R. Patty Jr.
ATTORNEY

3,179,158
HEATER UNIT
Norman Moreau, Pawtucket, R.I., assignor to Corning Glass Works, Corning, N.Y., a corporation of New York
Filed May 13, 1960, Ser. No. 29,105
3 Claims. (Cl. 158—117)

The present invention relates to heater units and particularly to a unit useful in directing heat into an article during its travel along a predetermined path. By way of example, in certain glass forming machines accumulations or charges of molten glass, while traveling from a supply source toward forming apparatus, lose an excessive amount of heat in certain regions thereof and upon being subjected to forming operations do not respond in a satisfactory manner. For example, if the accumulation of glass is to be blown, a poor wall thickness distribution may result because of the preceding excessive chilling of a particular portion of the accumulation or charge during its travel toward the forming apparatus.

According to the invention a heater unit has heat output elements provided along the path of travel of an article or a glass mold charge and is operated in such a fashion that its heat output is directed into the article or charge upon its entrance into such path and maintains its initial heat input relationship therewith as it travels along such path. In the specific embodiment herein illustrated and described the heater comprises a combustion fuel burner having jet burners with outlets or passages arranged in a row along the path of travel of glass charges to be heated. Air for supporting combustion is continuously supplied along the entire row of such jet burners.

Combustion fuel is temporarily supplied to the burners in close succession from a source supplied to them via a spiral groove in a shaft which is rotated at the speed necessary to present fuel to the successive jet burners of the row at a speed in accordance with the speed of travel of a glass charge so that the flame is propagated from the outlet of one burner to another and therefore continues to be directed toward such charge throughout its travel along such path.

For a better understanding of the invention reference is now made to the accompanying drawing wherein FIG. 1 shows in side elevation and, partly in section, a fragment of a well-known form of glass blowing machine with glass being supplied thereto and of an associated heater unit embodying the invention.

FIG. 2 is a top plan view of the heater unit.

FIG. 3 is a sectional view taken on line 3—3 of FIG. 1.

FIG. 4 is an enlarged plan view of a small fragment of the heater unit.

Referring to the drawing in detail, the reference numerals 11 and 12 designate ribbon forming rollers of a well-known form of glass bulb blowing machine having a stream of glass 13 being fed therebetween. The ribbon of glass issuing from between such rollers, as illustrated, has accumulations or charges 15 formed therein in uniformly spaced relation and is being deposited upon a conveyor embodying a chain of orifice plates 14 over whose orifices 16 the charges 15 from which ware is to be formed are arranged; see for example Woods et al., U.S. Patent No. 1,790,397. The charges such as 15 after traveling some distance are subjected to a shaping operation by blowing air supplied by blowheads such as 18. Extending along and below the horizontal path of charges 15 and their supporting orifice plates 14 to the region of blowhead 18, is a heater unit comprising a combustion fuel burner having three parallel rows of jet burners 36 having burner ports or outlets such as 17 directed toward the path of travel of the region of the orifice plates occupied by their orifices.

The burner embodies a tubular shaft 21 rotatably mounted in a closely fitting burner body 22 having suitable bearings such as 23 for shaft 21 embodied in the ends thereof and retained therein by end plates 24 and 25 respectively. Suitable O rings such as 27 occupy suitable grooves in shaft 21 near their ends to provide gas tight seals between the shaft ends and body 22. Endwise movement of shaft 21 relative to body 22 is prevented by suitable adjusting and lock nuts 31 and 30 threaded onto shaft 21.

The shaft 21 has a spiral groove 33 thereabout whose pitch corresponds to the spaces between the centers of the orifices 15 of two adjoining orifice plates 14 for reasons which will appear hereinafter. The groove 33 at its ends terminates in annular grooves such as 34 to continuously supply fuel to an end burner 36 of a row to provide pilot flames such as 65 at the burner ends. Passages such as 35 pass through the bottom of groove 33 into the bore of shaft 21 to provide for the passage of a combustion fuel, supplied to such bore, to such groove.

The burner body 22 is provided with passages arranged in three parallel rows, extending lengthwise of the assembly and each occupied by a tube comprising a jet burner 36. As will be noted in FIG. 4, the positions of the jet burners 36 of the respective rows form transverse rows corresponding to the pitch of the groove 33 and that their linear spacing is such as to bring as many as nine of the ports or outlets 17 of such jet burners into register with such groove at one time.

Burner body 22, as seen from FIG. 3, has formed in its outer surface longitudinally thereof combustion supporting air supply channels 41, 42 and 43. Semi-annular channels such as 44 connect channels 41, 42 and 43 in free communication with one another. A conduit 45 in communication with channel 42 is provided for supplying combustion supporting air to the respective channels.

Transverse slots 49 in body 22 extend between the channels 41 and 43 and regions adjacent the outer ends of jet burners, such as 36. A casing or tube 50 has an opening 51 surrounding the rows of jet burners 36 and closely surrounds body 22 to close the respective channels 41 to 43 and all but the extreme outer ends of grooves 49 in body 22.

The bore of shaft 21 at one end is connected to a fuel supply line 60 through a suitable rotatable coupling 61. At its other end shaft 21 is adapted to be driven through the medium of associated miter gears 62 and 63 and a stub shaft 64, and driving mechanism of the machine with which the burner is associated.

Operation

When air is supplied to the burner, through conduit 45, and a gaseous fuel is fed into the bore of shaft 21, through conduit 60, a minute volume of the fuel escapes from the groove 33 to about the outer surface of shaft 21 and through the jet burners along the entire length of the rows thereof. Although the amount of fuel escaping in this fashion may conveniently be sufficient to support a very short pilot flame along the entire length of the burner, the end jet burner 36 is the pilot flame source relied upon. As will be seen, since the pitch of the spiral groove equals the pitch or spacing between orifice plate centers of the machine, by arranging the shaft 21 in the proper rotary position with respect to the burner body 22, groups of rows of jet burners 36 that are in register with the groove 33 will be in register with the orifice plate orifices arranged over the burner outlets 17 of such burners. Fuel will accordingly be issued therefrom aided by combustion air supplied through the ends of associated slots 49 and will be initially ignited by the pilot flame issuing from an end jet burner 36 and direct their own flames against the bottom of glass bodies arranged over the orifices 15. By establishing a suitable drive between the mechanism of the machine which drives the conveyor of orifice plates and the stub 64, shaft 21 is rotated at the speed required to maintain or propagate the flames from jet burner to jet burner as they successively become directed toward the respective glass charges. As will thus be seen a glass heating flame is issued from the burner as a charge 15 deposited on an orifice plate 14 passes over a pilot flame 65, and a flame continues to be fed from consecutively associated jet burners which continue to direct heat into such body until it has passed over the last group of burners in the rows.

What is claimed is:

1. A burner comprising a shaft having a hollow bore, said shaft having an outer surface in the form of a surface of revolution about an axis, said shaft being rotatable about said axis, a continuous spiral groove formed in said outer surface of said shaft, said spiral groove having a plurality of convolutions and terminating at one end thereof in an annular portion extending around said shaft, means for the passage of gas from said bore to said groove, a hollow body about said shaft having an interior surface comprising a surface of revolution contiguous with the said outer surface of said shaft, said body having a plurality of apertures arranged in a line generally parallel to said axis, at least one of said apertures communicating with said annular portion of said groove at all positions of rotation of said shaft, means for supplying a combustible gas to said bore of said shaft, and means for rotating said shaft in a direction such that said groove and said line meet at a plurality of locations, each of which said locations moves progressively along said line away from said portion of said groove.

2. A burner comprising a shaft having a hollow bore, said shaft having an outer surface in the form of a surface of revolution about an axis, said shaft being rotatable about said axis, a continuous spiral groove formed in said outer surface of said shaft, said spiral groove having a plurality of convolutions and terminating at one end thereof in an annular portion extending around said shaft, means for the passage of gas from said bore to said groove, a hollow body about said shaft having an interior surface comprising a surface of revolution contiguous with the said outer surface of said shaft, said body having a plurality of apertures arranged in a line generally parallel to said axis, at least one of said apertures communicating with said annular portion of said groove at all positions of rotation of said shaft, means for supplying a combustible gas to said bore of said shaft, means for rotating said shaft in a direction such that said groove and said line meet at a plurality of locations, each of which said locations moves progressively along said line away from said portion of said groove, a hollow casing about said body, a passage in said casing, a source of air communicating with said passage, said passage terminating in a continuous opening adjacent to said apertures.

3. A burner comprising a shaft having a hollow bore, said shaft having an outer surface in the form of a surface of revolution about an axis, said shaft being rotatable about said axis, a continuous spiral groove formed in said outer surface of said shaft, said spiral groove having a plurality of convolutions and terminating at each end thereof in an annular portion extending about said shaft, means for the passage of gas from said bore to said groove, a hollow body about said shaft having an interior surface comprising a surface of revolution contiguous with the said outer surface of said shaft, said body having a plurality of apertures arranged in a line generally parallel to said axis, each said annular portion of said groove communicating with at least one of said apertures at all positions of rotation of said shaft, means for supplying a combustible gas to said bore of said shaft, and means for rotating said shaft.

References Cited by the Examiner
UNITED STATES PATENTS

| | | | |
|---|---|---|---|
| 1,790,397 | 1/31 | Woods et al. | 49—5 |
| 1,807,566 | 5/31 | Canfield | 49—5 |
| 1,949,901 | 3/34 | Cosh | 49—58 |
| 2,209,252 | 7/40 | Stewart et al. | 49—58 |
| 2,210,069 | 8/40 | Ensign | 158—99 |
| 2,294,019 | 8/42 | Boyle | 263—52 |
| 2,228,114 | 1/49 | Hess | 158—99 |
| 2,575,736 | 11/51 | Sohn | 158—116 |
| 2,605,091 | 7/52 | Socke | 263—9 |
| 2,625,387 | 1/53 | Hess | 263—52 |

JAMES W. WESTHAVER, *Primary Examiner.*

CHARLES R. HODGES, PERCY L. PATRICK, MEYER PERLIN, *Examiners.*